United States Patent [19]

Myers

[11] Patent Number: 4,580,102
[45] Date of Patent: Apr. 1, 1986

[54] UTILIZING CARRIER CONSTRUCTION

[75] Inventor: Michael H. Myers, Poway, Calif.

[73] Assignee: Motorola, Inc., Schaumburg, Ill.

[21] Appl. No.: 553,670

[22] Filed: Nov. 21, 1983

[51] Int. Cl.[4] ............................................. H03D 3/00
[52] U.S. Cl. ................................... 329/122; 329/110; 331/17; 331/23
[58] Field of Search ..................... 331/11, 12, 17, 23; 329/50, 110, 122, 124; 328/133, 134

[56] References Cited

U.S. PATENT DOCUMENTS

| | | | |
|---|---|---|---|
| 3,979,692 | 9/1976 | Benoist et al. | 331/11 X |
| 4,336,500 | 6/1982 | Attwood | 331/12 X |
| 4,507,617 | 3/1985 | Sasaki | 331/23 X |

OTHER PUBLICATIONS

Principles of Coherent Communication, Andres J. Viterbi, McGraw-Hill Book Company, New York, pp. 272–275.

*Primary Examiner*—Eugene R. LaRoche
*Assistant Examiner*—Robert J. Pascal
*Attorney, Agent, or Firm*—Eugene A. Parsons

[57] ABSTRACT

An input signal is multiplied by a reference and quadrature signal and the two output signals are integrated and multiplied by a ramp signal, having a period equal to the maximum period of the input signal, and integrated to provide four output signals. The integrated product of the input, reference and ramp signals is multiplied by the integrated product of the input and quadrature signals and the product is subtracted from the product signal of the integrated product of the input and reference signals multiplied by the integrated product of the input, quadrature and ramp signals. The difference output signal is the gradient of the envelope of the maximum posterior-probability estimate of the frequency of the input signal.

10 Claims, 4 Drawing Figures

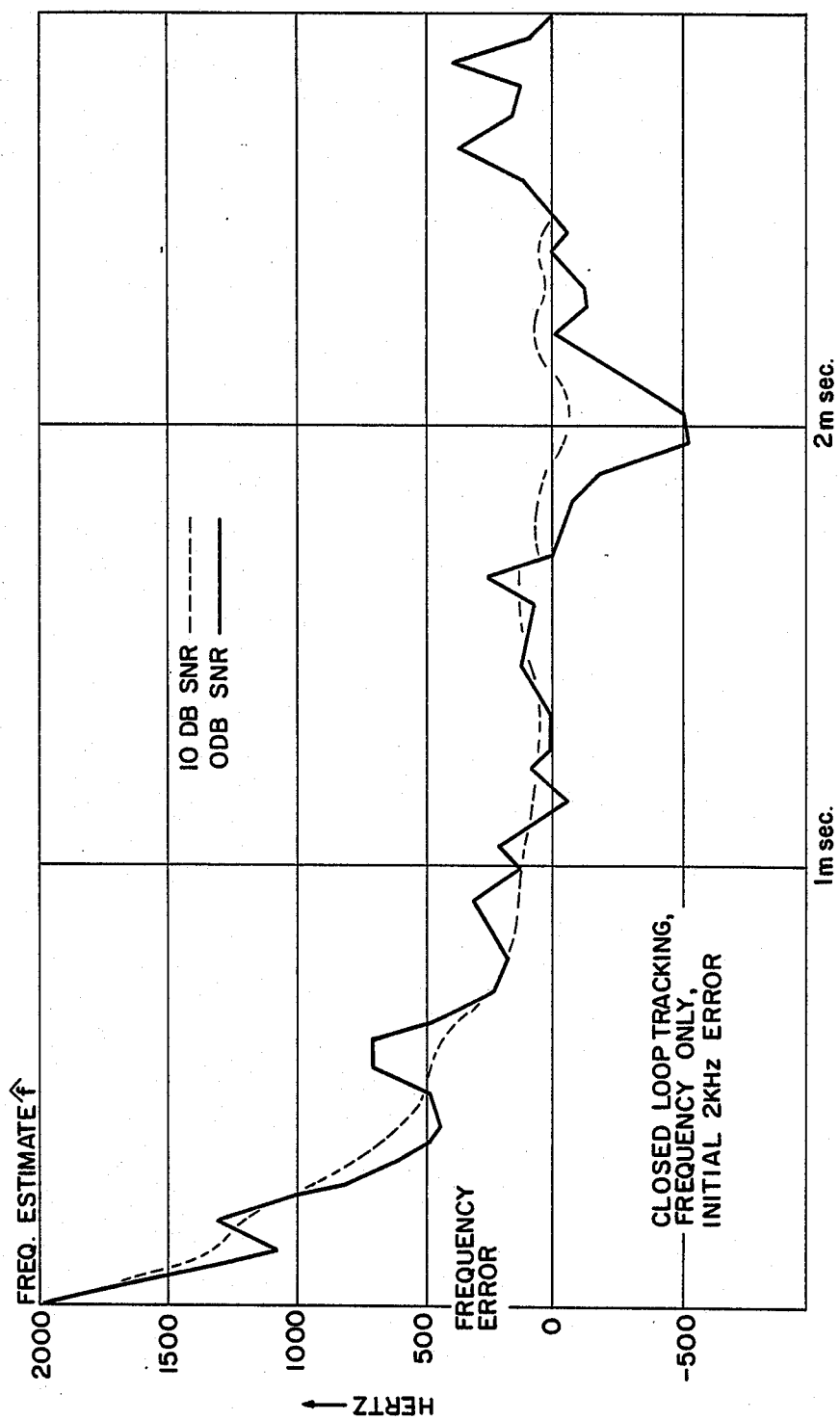

UTILIZING CARRIER CONSTRUCTION

BACKGROUND OF THE INVENTION

In communications systems wherein a carrier is modulated with digital signals, such a phase shift keyed modulation, it is desirable to recover the carrier so that the phase shifts may be determined during demodulation. Generally, a discriminator is a device in which amplitude variations are derived in response to frequency or phase variations. By constructing a discriminator wherein amplitude variations are derived in response to only the carrier frequency, the discriminator can be utilized for carrier reconstruction.

SUMMARY OF THE INVENTION

The present invention pertains to a frequency discriminator including a source of ramp signals and a source of reference and quadrature signals with means for multiplying the signals together to provide for output signals including an input/reference signal, an input/quadrature signal, an input/reference/ramp signal and an input/quadrature/ramp signal, integration means for providing for output signal representative of the integral of each of the product signals, and means for further multiplying and combining the signals to provide an output signal representative of the product of the integral of the input/reference signal and the integral of the input/quadrature/ramp signal minus the product of the integral of the input/quadrature signal and the input/reference ramp signal. The output signal is the gradient of the envelope representing the maximum posterior-probability estimate of the frequency of the carrier. The maximum posterior-probability estimate of the frequency is that value of the frequency which causes the gradient to be zero. Therefore, the gradient is used as an error control signal in a loop and the reference signal is at the frequency of the carrier when the error control signal is zero.

It is an object of the present invention to provide a new and improved frequency discriminator.

It is a further object of the present invention to provide a new and improved frequency discriminator which can be utilized to acquire the carrier for reconstruction thereof.

It is a further object of the present invention to provide a frequency discriminator having no tune circuits, a variable bandwidth and which can be made very linear.

It is a further object of the present invention to provide a frequency discriminator which can be easily implemented in digital form.

These and other objects of this invention will become apparent to those skilled in the art upon consideration of the accompanying specification, claims and drawings.

BRIEF DESCRIPTION OF THE DRAWINGS

Referring to the drawings,

FIG. 4 is a graphic representation of the frequency estimate of two inputs as determined by the discriminator of FIG. 2 with the loop closed.

DESCRIPTION OF THE PREFERRED EMBODIMENTS

For a received signal $$y(t) = \sqrt{2} \, A \sin(\omega t + \phi) + n(t) \quad (0 \leq t \leq T)$$

the maximum posterior-probability estimate of frequency $\omega$ is the value of $\hat{\omega}$, a modified $\omega$, which maximizes $$Z^2(\omega) = \left[ \int_0^T \sqrt{2} \, y(t) \sin\hat{\omega} t \, dt \right]^2 + \left[ \int_0^T \sqrt{2} \, y(t) \cos\hat{\omega} t \, dt \right]^2 \quad (1)$$

This equation is derived by Viterbi, in A. J. Viterbi, "Principles of Coherent Communication," McGraw Hill, 1966, p.274.

The gradient of the above envelope with respect to the frequency estimate $\omega$ is then obtained as:

$$\gamma(\omega) = \frac{dZ^2(\omega)}{d\omega} = \quad (2)$$

$$2 \int_0^T \sqrt{2} \, y(t) \sin\hat{\omega} t \, dt \int_0^T \sqrt{2} \, t \, y(t) \cos\hat{\omega} t \, dt -$$

$$2 \int_0^T \sqrt{2} \, y(t) \cos\hat{\omega} t \, dt \int_0^T \sqrt{2} \, t \, y(t) \sin\hat{\omega} t \, dt$$

Therefore the maximum posterior estimate of $\omega$ is that value of $\omega$ which causes $\gamma(\omega)$ to be zero.

The gradient can be used as an error control signal in a closed loop, in order to drive $\gamma(\omega) \rightarrow 0$.

Figure 1:
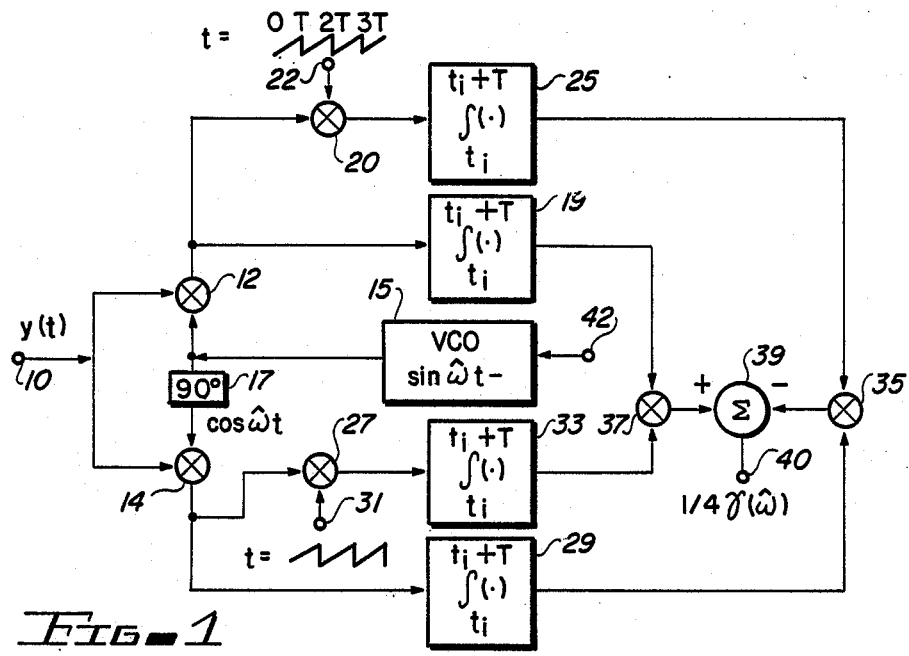
FIG. 1 is block diagram of an analog frequency discriminator embodying the present invention.

Referring specifically to FIG. 1, analog circuitry is illustrated for developing an electrical signal representative of the gradient of the maximum posterior-probability envelope set forth in equation (2). An input terminal 10 is adapted to have the received signal y(t) applied thereto. Terminal 10 is connected directly to a first input of a multiplier 12 and a first input of a multiplier 14. A voltage controlled oscillator (VCO) 15 supplies a reference signal sin $\omega t$ directly to a second input of the multiplier 12. A quadrature signal cos $\omega t$ is developed by connecting the output reference signal from the VCO 15 through a phase shifting network 17 to a second input of the multiplier 14. The product of the two signals applied to the multiplier 12 appears as an output signal which is applied to an input of an integrator 19. The output signal from the multiplier 12 is also supplied to a first input of a multiplier 20. A second input of the multiplier 20 is connected to a terminal 22 adapted to have a ramp signal applied thereto. The ramp signal is a repetitive signal representative of the period of time t and extends linearly from zero to the maximum time T, after which it returns to zero and extends to the maximum time 2T, etc. The output signal from the mulitplier 20, which is representative of the product of the two input signals is applied to an input of an integrating circuit 25. An output signal from the multiplier 14, representative of the product of the two signals applied thereto, is supplied to a first input of a multiplier 27 and directly to the input of an integrating circuit 29. The multiplier 27 has a second input connected to a terminal 31 adapted to receive the ramp signal thereon and the output of the multiplier 27, which is a signal representative of the product of the two signals supplied thereto, is connected to an input of an integrating circuit 33. Output signals representative of the integrated products in circuits 25 and 29 are supplied to first and second inputs of a multiplier 35. Output signals representative of the integtated products in integrating circuits 19 and 33 are supplied to first and second inputs, respectively, of a multiplier 37. An output signal representative of the product of the two signals supplied to the inputs of the multiplier 35 is connected to the negative input of a combining, or summation, circuit 39. A signal representative of the product of the two inputs applied to the multiplier 37 is connected to a positive input of the combining circuit 39 so that the signal supplied by the multiplier 35 is subtracted from the signal supplied by the multiplier 37. An output signal representative of the gradient of the envelope, as defined by equation (2), is produced at the output of the combining circuit 39, which output signal is available on a terminal 40. As stated previously, the gradient can be driven to zero by coupling the terminal 40 to an input terminal 42 connected to a control input of the VCO 15. Generally, the terminal 40 will be connected to the terminal 42 through a loop filter or the like to remove noise and extraneous signals.

Figure 2:
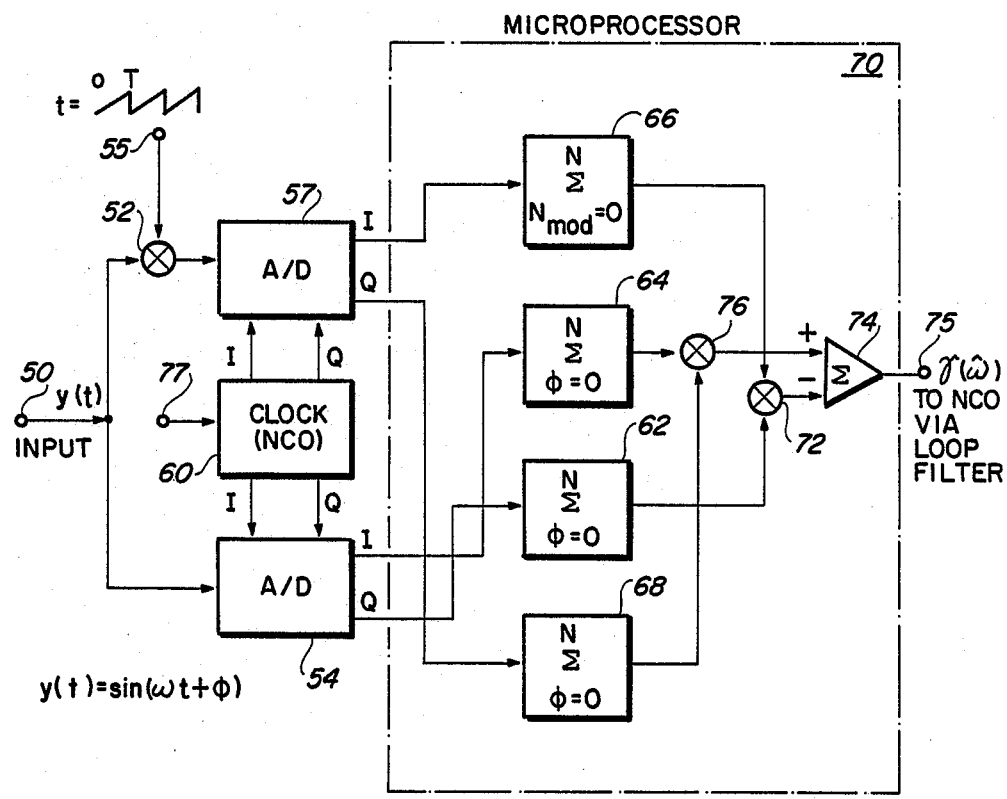
FIG. 2 is a block diagram of a frequency discriminator completely in digital form, embodying the present invention.

Referring specifically to FIG. 2, digital circuitry is illustrated for providing the gradient signal defined by equation (2). An input terminal 50 is adapted to receive the input signal y(t) and supply the signal to a first input of a multiplier 52 and to the input of an analog to digital converter 54. The multiplier 52 has a second input connected to a terminal 55 adapted to receive a ramp signal similar to the ramp signal defined in conjunction with the circuitry of FIG. 1. An output signal from the multiplier 52 representative of the product of the two signals supplied to the inputs thereof is supplied directly to an input of an analog to digital converter 57. A clock, which in this embodiment is a numerically controlled oscillator 60, supplies an in phase and quadrature reference signal to each of the converters 54 and 57. The numerically controlled oscillator (NCO) 60 may be, for example, the type of NCO disclosed in U.S. Patent Application entitled "Improved Numerically Controlled Oscillator", Ser. No. 392,852, filed June 28, 1982 and assigned to the same assignee. The analog to digital converters 54 and 57 provide in phase and quadrature output signals which are representative of the products of the input signals. A first output signal from the converter 54, representative of the product of the input signal and the quadrature reference signal (input/quadrature signal) is supplied to a digital summation circuit 62. A second output signal representative of the product of the input signal and the in phase reference signal (input/reference signal) is supplied to an input of a digital summation circuit 64. An output signal from the converter 57, representative of the product of the input signal, the ramp signal and the in phase reference signal (input/ramp/reference signal) is supplied to an input of a digital summation circuit 66. A second output signal from the converter 57 representative of the product of the input signal, the ramp signal and the quadrature reference signal (input/ramp/quadrature signal) is supplied to an input of a digital summation circuit 68. Each of the summation circuits, 62, 64, 66 and 68 can be incorporated in a microprocessor generally designated 70. It will be understood by those skilled in the art that digital summation as provided by the disclosed digital summation circuit is equivalent to the process of integrating a signal. Thus, the output signals from the integration circuits are an integral of the product signals supplied thereto. Two of the integrated product signals from the circuits 62 and 66 are supplied to two inputs of a multiplier 72 with the output signal therefrom being supplied to the negative input of a combining circuit 74. The other two integrated product signals from the circuits 64 and 68 are supplied to two inputs of a multiplier 76, the output of which is connected to the positive input of the combining circuit 74 so that the signal representative of the product of the first two signals is subtracted therefrom. The signal representative of the difference between the two product signals is supplied to an output terminal 75 and is representative of the gradient defined by equation (2). In order to drive the gradient to zero the terminal 75 is coupled to an input terminal 77 connected to a control input of the NCO 60. Generally, the terminal 75 will be coupled to the terminal 77 through a loop filter or the like.

In the digital embodiment of the frequency discriminator illustrated in FIG. 2, all of the components illustrated are provided in digital form, except the ramp multiplication in multiplier 52. Performing the ramp multiplication in analog form permits greater speed with the microprocessor 70. However, it will be understood by those skilled in the art that the ramp multiplication can be performed internal to the microprocessor in digital form and subsequent to the analog to digital conversion. It should also be understood that while the NCO 60 and analog to digital convertors 54 and 57 are illustrated as separate from the microprocessor 70, the entire structure might be included on a single chip.

Figure 3:
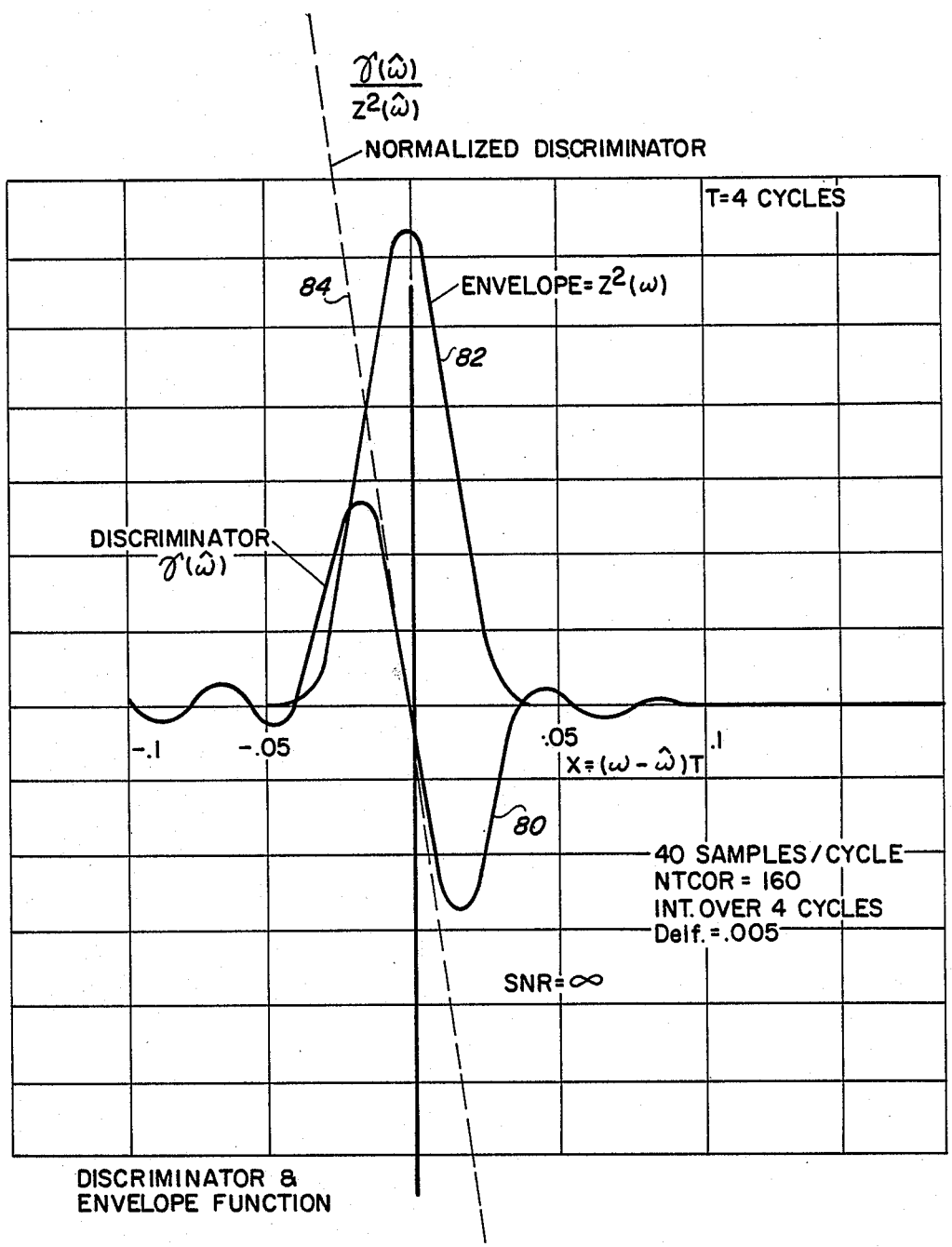
FIG. 3 is graphic representation of the discriminator and envelope functions for the apparatus of FIG. 2.

Referring specifically to FIG. 3, the gradient expression of equation (2) is plotted verses the envelope function of equation (1). In FIG. 3 the plot of the gradient expression is designated 80 and the plot of the envelope is designated 82. The normalized gradient (the gradient divided by the envelope) is also plotted in dotted line and designated 84. FIG. 3 verifies the discriminator characteristic of the circuits illustrated in FIGS. 1 and 2 and verifies that equation (2) represents a valid frequency gradient of the envelope power function of equation (1). FIG. 4 is a plot of the frequency estimate when the terminal 75 of the apparatus of FIG. 2 is coupled through a loop filter to the terminal 77 to close the loop. The input signal had a 2 kilohertz error with a time constant of approximately 6 milliseconds, with input SNR equal to 10 db (in dotted line) and zero db (in solid line).

Thus, an improved frequency discriminator is illustrated and described which is simple to implement utilizing a microprocessor, uses no tune circuits and has a variable bandwidth (discriminator range). Further, since input data is cancelled the frequency discriminator eliminates false lock problems with large offsets. In the digital embodiment the discriminator's shape is digitally controlled so that it can be varied. While I have shown and described specific embodiments of this invention, further modifications and improvements will occur to those skilled in the art. I desire it to be understood, therefor, that this invention is not limited to the particular forms shown and I intend in the appended claims to cover all modifications which do not depart from the spirit and scope of this invention.

I claim:

1. A frequency discriminator adapted to have an input signal applied thereto, said discriminator comprising:

a source of timing signals representative of periods of time;

a source of a reference signal and the quadrature thereof;

multiplying means connected to receive the input signal, and the reference and quadrature signals and the timing signals for providing four output signals, an input/reference signal, an input/quadrature signal, an input/reference/timing signal and an input/quadrature/timing signal;

integration means connected to said multiplying means for receiving the four output signals therefrom and providing four output signals representative of the integral of each of the four output signals;

first multiplying means connected to said integration means for receiving two of the output signals therefrom representative of the integral of the input/reference signal and the integral of the input/quadrature/timing signal and providing an output signal representative of the product thereof;

second multiplying means connected to said integration means for receiving the remaining two of the output signals therefrom, representative of the integral of the input/quadrature signal and the input/reference/timing signal, and providing an output signal representative of the product thereof; and combining means connected to said first and second multiplying means for receiving the output signals therefrom and providing an output signal representative of the output signal of said second multiplying means subtracted from the output signal of said first multiplying means.

2. A frequency discriminator as claimed in claim 1 wherein the source of reference signal includes a voltage controlled oscillator.

3. A frequency discriminator as claimed in claim 2 wherein the voltage controlled oscillator is coupled to said combining means for receiving the output signal therefrom and utilizing the output signal to control the reference signal.

4. A frequency discriminator as claimed in claim 1 wherein the integration means, first multiplying means, second multiplying means and combining means are implemented in digital form.

5. A frequency discriminator as claimed in claim 4 wherein the source of a reference signal and the quadrature thereof includes a numerically controlled oscillator.

6. A frequency discriminator as claimed in claim 5 wherein the numerically controlled oscillator is coupled to said combining means for receiving the output signal therefrom and utilizing the output signal to control the reference signal.

7. A frequency discriminator as claimed in claim 4 wherein at least the integration means, the first and second multiplying means and the combining means are included in a microprocessor.

8. A frequency discriminator adapted to have an input signal $y(t)$, with $t$ being in the range $0 \leq t \leq T$, applied thereto, said discriminator comprising:

a source of ramp signals having the period $T$;

a source of a reference signal $\sin \hat{\omega} t$ and a quadrature signal $\cos \hat{\omega} t$;

means coupled to receive the input signal and further coupled to said sources for combining and operating on the input, ramp, reference and quadrature signals to provide a first output signal representative of $$2 \int_0^T \sqrt{2} \, y(t) \sin \hat{\omega} t \, dt \quad \int_0^T \sqrt{2} \, t \, y(t) \cos \hat{\omega} t \, dt$$

and a second output signal representative of $$2 \int_0^T \sqrt{2} \, y(t) \cos \hat{\omega} t \, dt \quad \int_0^T \sqrt{2} \, t \, y(t) \sin \hat{\omega} t \, dt;$$

and combining means coupled to receive the first and second output signals and provide an output signal representative of the first output signal minus the second output signal.

9. A frequency discriminator as claimed in claim 8 wherein the frequency of said source of reference and quadrature signals is adjustable.

10. A frequency discriminator as claimed in claim 9 having, in addition, means coupled to said combining means and said adjustable source of reference and quadrature signals for adjusting said adjustable source to drive the output signal of said combining means substantially to zero.

* * * * *